United States Patent [19]

Metzger

[11] 3,795,761

[45] Mar. 5, 1974

[54] COLOR VIDEO FILM RECORDING WITH SEGMENTED COLOR FILTER

[75] Inventor: Lenard M. Metzger, Rochester, N.Y.

[73] Assignee: Eastman Kodak Company, Rochester, N.Y.

[22] Filed: July 3, 1972

[21] Appl. No.: 268,294

[52] U.S. Cl. .......................... 178/5.2 D, 178/6.7 A

[51] Int. Cl. .......................... H04n 9/00, H04n 5/84

[58] Field of Search 178/5.4 CD, 5.2 D, 6.7 A, 5.4 ST

[56] References Cited

UNITED STATES PATENTS 2,552,070 5/1971 Sziklai .......................... 178/5.4 ST

*Primary Examiner*—Howard W. Britton
*Assistant Examiner*—George G. Stellar

[57] ABSTRACT

Method and apparatus for recording video information derived from composite video field signals including horizontal and vertical synchronizing and blanking signals, luminance signals, and red, blue and green chrominance signals as color pictorial information in frames on photosensitive motion picture film advanced through a film scanning zone. A flying spot scanner responds to the luminance signal and the horizontal and vertical deflection and blanking signals to generate a scanning beam of white light comprising the red, blue and green colors of light and to direct the beam along a predetermined path to expose the motion picture film in the film scanning zone. An optical filter disposed in the predetermined path comprises a repetitive pattern of successive red, blue and green color stripe filters to impart color to the scanning beam. Optical-to-electrical signal transducer circuits respond to the red, blue and green color of light transmitted by the respective red, blue and green stripe filters for producing corresponding red, blue and green color control signals, and first, second and third respective switches respond to the respective color control signals for applying the red, blue and green chrominance colors in the video information to a grid of the flying spot scanner to control the instantaneous intensity of the beam of light as a function of the instantaneous intensity of the corresponding chrominance signal.

8 Claims, 3 Drawing Figures

COLOR VIDEO FILM RECORDING WITH SEGMENTED COLOR FILTER

CROSS REFERENCE TO RELATED APPLICATIONS

Reference is made to commonly assigned copending U.S. application, Ser. No. 268,320 entitled BLANKING METHOD AND APPARATUS FOR VIDEO FILM RECORDER, filed in my name on even date herewith, and to U.S. application, Ser. No. 60,493 entitled FILM SCANNING FOR TELEVISION REPRODUCTION, filed in the names of David L. Babcock and Lenard M Metzger on Aug. 3, 1970.

BACKGROUND OF THE INVENTION

1. Field of the Invention

This invention relates to video recording apparatus, and more particularly to a method and apparatus employing a white light source and color filters for recording color video information as color pictorial information in frames on photosensitive motion picture film.

2. Description of the Prior Art

Video color information has been heretofore recorded as pictorial information on recording media such as photographic film through the use of kinescope recorders and electron beam recorders. Kinescope recorders employ special movie cameras having a lens and an intermittent or continuous drive mechanism for photographing scanned patterns or pictures from the face of a kinescope or picture tube of a television receiver. The television receiver responds to the transmitted television signal to derive composite video field signals including horizontal and vertical synchronizing and blanking signals, a luminance signal and color signals and to transform the video field signals into pictures on the face plate of the kinescope recurring at the standard (in the United States) 60 Hz. frequency of the vertical deflection signal. The movie camera intermittently or continuously advances the motion picture film at a standard film frame rate of 18 or 24 frames per second, and optical or mechanical apparatus is interposed between the face plate of the kinescope and the film gate of the motion picture camera to synchronize the video field rate to the intermittent or continuous frame rate of movement of the motion picture film. U.S. Pat. Nos. 2,622,147 and 3,014,090 are illustrative of such kinescope recorders. Both black and white and color pictures displayed on black and white or color kinescopes may be recorded on the correspondingly sensitive motion picture film.

In electron beam recording, the glass face plate of the kinescope, its associated phosphor screen and the camera lens are eliminated by bringing the electron sensitive media, such as photographic film, inside the vacuum chamber of the tube. Such known electron beam recorders provide increased resolution of pictures recorded on the electron sensitive media but are limited to black and white or color-coded black and white recording. An electron beam recorder of this type is disclosed in U.S. Pat. No. 3,444,317 wherein motion picture film intermittently advanced at 24 frames per second is exposed to an electron beam modulated by a video field signal recurring at 60 fields per second, and synchronization apparatus is proposed for synchronizing the 24 frames per second intermittent rate of advancement to the 60 fields per second video signal. Another electron beam recorder is disclosed in the publication entitled EVR: MOVIES AND MICROFILM ON THE TV SCREEN by L. Andrew Mannheim, published in *Technical Photography* on Sept. 23, 1969, wherein a special film is continuously advanced at 30 frames per second during recording. Because of the complexity and expense of kinescope and electron beam recorders that are capable of achieving satisfactory results, such recorders are generally restricted in use to professional film producing and television studios.

In the aforementioned, commonly assigned, copending U.S. Application, Ser. No. 60,493, there is disclosed a method and apparatus for scanning color motion picture film and deriving video signals representative of the pictorial information on the film for application to a home television receiver, whereby the pictorial information may be viewed in color on the receiver screen. This apparatus includes a black and white flying spot scanner for scanning the image frames of the motion picture film with a scanning beam of white light, means for moving the motion picture film continuously through a film scanning zone at the standard film rate of the film, such as 18 or 24 frames per second, optical-to-electrical signal transducer apparatus responsive to the scanning beam of light transmitted through the image frames on the film and modulated in intensity and color by the image frames for producing the chrominance and luminance electrical signals of each video field signal, and synchronizing means responsive to the detected rate of movement of the film and the standard 60 Hz. vertical synchronizing signal for synchronizing the vertical deflection of the video field raster pattern generated by the flying spot scanner to the instantaneous position and velocity of image frames moving through the film scanning zone. This apparatus may be incorporated in a teleplayer adapted to receive either amateur or professional, cartridge or open reel, motion picture film of such a price and quality as to be attractive for sale in the commercial and the home entertainment markets. Applicant has recognized that such a film teleplayer may be simply and inexpensively adapted to a television receiver to receive televised video information and record the video information on photosensitive photographic film continuously driven through the same film scanning zone.

BRIEF SUMMARY OF THE INVENTION

Accordingly, it is an object of this invention to provide an improved method and apparatus for recording video information on photosensitive media.

It is also an object of this invention to provide an improved method and apparatus for receiving and recording televised video information as pictorial information on media frames of continuously moving photosensitive media.

It is a further object of this invention to provide an improved video recording method and apparatus employing a scanning beam of white light directed through an optical color filter to record color video information on image frames in photosensitive media.

Another object of this invention is to employ a scanning beam of white light transmitted through an optical filter comprising a repetitive color filter pattern to record color video field signals as color pictorial information on photosensitive media and to control the intensity of the scanning beam of light as a function of the received color video field signals and the instantaneous color of the light transmitted through the optical filter.

In accordance with these and other objects of the invention, improved video recording apparatus and methods are disclosed for recording video information derived from composite video field signals including a plurality of chrominance signals as color pictorial information in media frames on photosensitive media advanced through a media scanning zone. The improved video recording apparatus further comprises scanning means for generating a beam of light comprising at least the plurality of colors of light, for deflecting the beam of light in a scanning raster pattern, and for directing the beam along a predetermined path to expose the photosensitive media advanced through the media scanning zone in media frames corresponding to the raster pattern of the beam of light, an optical filter disposed in the predetermined path comprising a repetitive pattern of a corresponding plurality of color filters selectively transmissive of the corresponding plurality of colors of light, optical-to-electrical signal transducer means responsive to the colors of light in the beam of light transmitted through the color filters for producing a corresponding plurality of color control signals, and means responsive to the color control signals for applying the corresponding chrominance signals to the scanning means to modulate the intensity of the scanning beam of light concurrently transmitted by the optical filter. In the disclosed preferred embodiment of the invention, the scanning means comprises a flying spot scanner for producing a beam of white light deflected in a scanning raster pattern under the control of horizontal and vertical synchronizing and blanking signals in the composite video field signal, and the optical filter comprises a repetitive pattern of red, blue and green color filter stripes. As the scanning beam is transmitted successively by the red, blue and green filter stripes, the photosensitive media is exposed to red, blue and green light, respectively. The optical-to-electrical signal transducer means detects the exposing color, and the intensity of the scanning beam of light is accordingly modulated in intensity by the corresponding red, blue or green chrominance signals in the received video field signal.

Other objects and advantages of the invention will become apparent from the following detailed description taken in connection with the accompanying drawings.

BRIEF DESCRIPTION OF THE DRAWINGS

In the detailed description of the preferred embodiment of the invention presented below, reference is made to the accompanying drawings, in which.

DETAILED DESCRIPTION OF THE INVENTION

As stated hereinbefore, commonly assigned, copending U.S. application, Ser. No. 60,493 discloses a method and apparatus for scanning conventional color motion picture film and deriving video signals representative of the pictorial information on the film for application to a home television receiver. Many of the elements shown within the dashed line 10 of FIG. 1 correspond to elements previously described in detail in U.S. application, Ser. No. 60,493. These common elements are advantageously employed in the video recording apparatus of the present invention for recording video information as color pictorial information in frames on conventional color motion picture film having perforations or indicia disposed along the film that are normally used in a motion picture camera to intermittently position successive frame areas of the film in the film gate of the camera. Therefore, the frames of conventional motion picture film are referenced to particular indicia or perforations during conventional exposure of the film.

Figure 1:
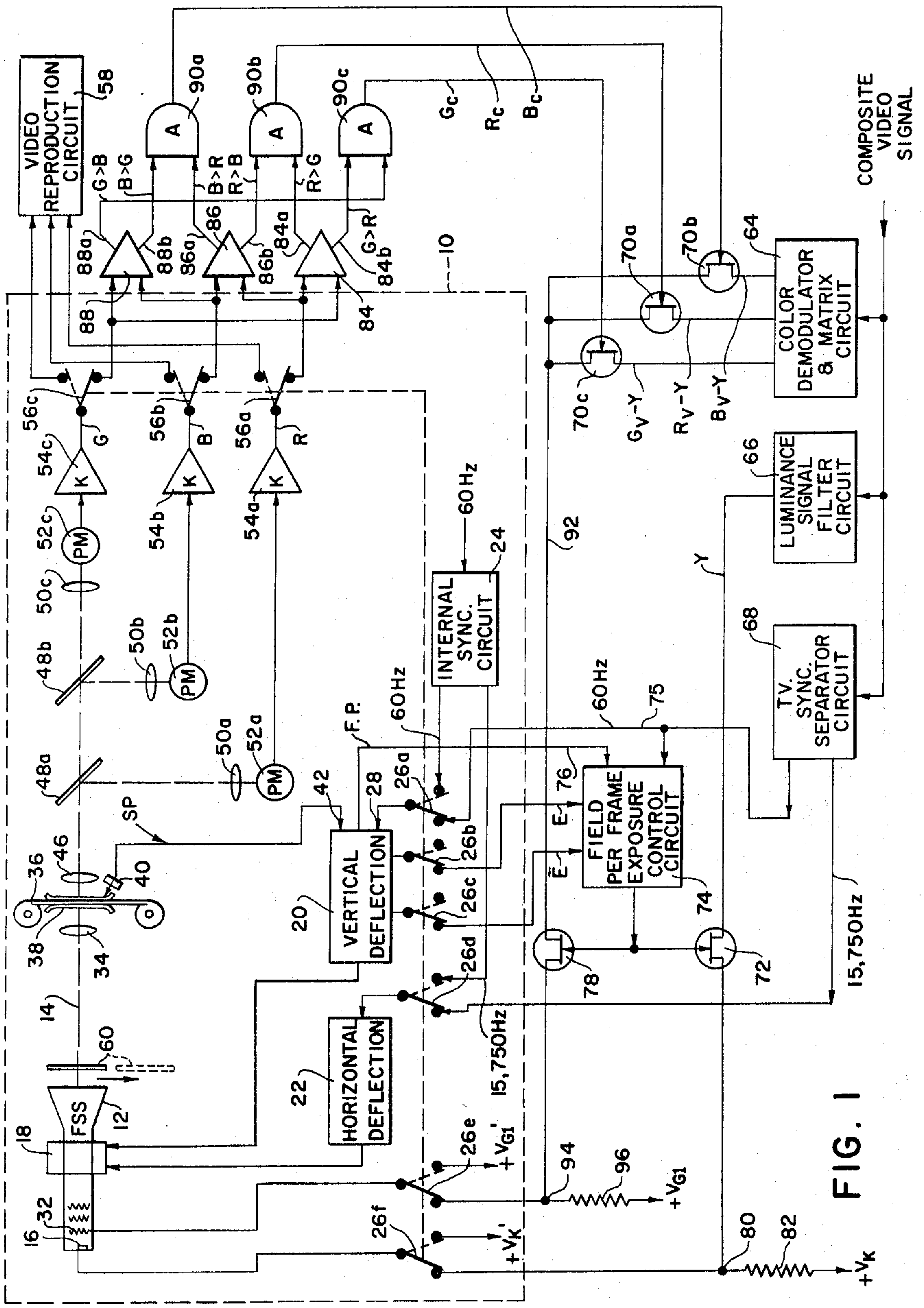
FIG. 1 is a circuit diagram of an illustrative embodiment of the video recording apparatus of the present invention.

These common elements of the circuit diagram of FIG. 1 comprise a flying spot scanner 12 for producing a scanning beam 14 when the electrons emitted by the cathode 16 strike the face plate of the flying spot scanner 12. The scanning beam 14 is deflected vertically and horizontally over the face plate of the flying spot scanner 12 by the magnetic field induced in the vertical and horizontal deflection yoke 18 in response to a corresponding vertical deflection signal and a horizontal deflection signal developed by the vertical and horizontal deflection circuits 20 and 22. An internal sync generator 24 responds to a 60 Hz. a.c. line signal to produce a 60 Hz. (59.97 Hz. for color) vertical sync signal for application via switch **26*a* to a first input terminal 28 of the vertical deflection circuit 20 and a 15,750 Hz. horizontal sync signal for application via switch 26*d* to the input terminal of horizontal deflection circuit 22. The scanning beam 14 is deflected in the horizontal direction, that is, transversely to the direction of film advance, under control of the horizontal deflection circuit 22, 262½ times during each video field, which corresponds in time duration to the period of the 60 Hz. vertical sync signal. During video reproduction, the switches 26*e* and 26*f* connect the constant voltage signals $+V_{g1}'$ and $+V_k'$, respectively, to the grid 32 and cathode 16, respectively, of the flying spot scanner 12 to maintain the intensity of the scanning beam 14 constant. As is well known in the art, the intensity of the scanning beam 14** may be reduced by blanking apparatus (not shown) during the vertical and horizontal retrace periods of the horizontal and vertical deflection signals, respectively.

The constant intensity scanning beam 14 is imaged by lens 34 upon image frames on the media 36, comprising motion picture film, continuously advanced through a film scanning zone 38 defined by a film gate having an aperture equal to twice the distance between successive perforations in the film. The aforementioned film drive perforations are sensed by an indicia or perforation sensor 40 that produces a frame rate signal SP having a frequency equal to the frame rate of movement of the film 36, which is normally either 18 or 24 frames per second. The frame rate signal is applied to a second input terminal 42 of the vertical deflection circuit 20. The vertical deflection circuit 20 responds to the 60 Hz. vertical sync signal and the 24 Hz. or 18 Hz. frame rate signal to produce a composite vertical deflection signal that is applied to the horizontal and vertical deflection yoke 18 of the flying spot scanner tube 12. The composite vertical deflection signal deflects the scanning beam 14 in the vertical direction, that is parallel to the direction of movement of the film 36, at the beginning of each video field an amount sufficient to compensate for the rate of movement of the film 36 to position the subsequent scanning raster pattern developed by the flying spot scanner 12 upon a continuously moving image frame of the film 36. The production of the complex vertical deflection signal is more clearly explained in the aforementioned U.S. application, Ser. No. 60,493.

The scanning beam 14 transmitted through the image frames on motion picture film 36 is modulated in color and intensity by the color pictorial information in the image frames, and the modulated beam is imaged by lens 46, dichroic filters 48*a* and 48*b* and lenses 50*a*, 50*b* and 50*c* upon photosensitive devices 52*a*, 52*b* and 52*c*. The dichroic filter 48*a* is operative to reflect red light upon the photosensitive device 52*a* and transmit blue and green light to the dichroic filter 48*b* which reflects blue light to the photosensitive device 52*b* and transmits green light to the photosensitive device 52*c*. The photosensitive devices 52*a*–52*c* transform the received colors of light into red, blue and green color signals R, B and G which are amplified by amplifiers 54*a*–54*c* and applied by switches 56*a*–56*c* (when the switches 26*a*–26*e* and 56*a*–56*c* are located in the dashed line positions) to a video reproduction circuit 58 of a color television transmitter or receiver.

An audio trnsducer (not shown) may also be provided to pick up the sound track on the motion picture film 36 and apply an audio signal to the television receiver to reproduce the sound track in synchronism with the reproduction of the image frames. The red, blue and green color signals, the 60 Hz. vertical sync signal, the 15,750 Hz. horizontal sync signal and the audio signal may also be applied to video encoding circuits (not shown) of the video reproduction apparatus for producing composite video field signals for direct application to the antenna terminal of the television receiver or transmission of the composite video field signal to a remote receiver. Alternatively, these signals may be applied directly to the appropriate television display circuits through switching apparatus in a manner shown, for example, in U.S. Pat. No. 3,553,352 entitled PHOTOGRAPHIC FILM AND TELEVISION SIGNAL REPRODUCTION APPARATUS.

The remaining elements of the circuit of FIG. 1 comprise, in combination with the common elements described heretofore, the video recording apparatus of my invention. A composite video signal is received by a television receiver from a remote transmitting station and is applied to the depicted color demodulator and matrix circuit 64, the luminance signal filter 66 and the TV sync separator circuit 68 which may comprise elements of the television receiver and are well known in the prior art. In fact, the circuits 64 and 68 and the filter 66 may comprise elements of the television receiver and further switches may be provided at their outputs to direct the video signals to the remaining elements of the television receiver for normal television reproduction of transmitted television programs as suggested by the aforementioned U.S. Pat. No. 3,553,352. The color demodulator and matrix circuit 64 operates in a manner well known in the prior art to separate from the composite video field signals the red, blue and green chrominance or color difference signals $R_v - Y$, $B_v - Y$ and $G_v - Y$, respectively, that are applied to the source terminals of normally nonconductive FET switches 70*a*, 70*b* and 70*c*, respectively. The luminance signal filter 66 responds to the composite video field signal to produce a high resolution luminance signal Y that is applied to the source terminal of normally conductive FET switch 72. The TV sync separator circuit 68 responds to the composite video field signal to detect the 60 Hz. vertical sync and blanking signals and the 15,750 Hz. horizontal sync and blanking signals in the composite video field signals. In as much as switches 26*a* and 26*d* are connected as shown in FIG. 1, the 60 Hz. vertical sync signal is applied to the first input terminal 28 of vertical deflection circuit 20, and the 15,750 Hz. horizontal sync signal is applied to the horizontal deflection circuit 22. The vertical sync signal is also applied to an input terminal of a field-per-frame exposure control circuit 74.

The vertical deflection circuit 20 responds to the received and separated 60 Hz. signal and the 18 or 24 Hz. frame rate signal to produce the composite vertical deflection signal in the manner hereinbefore described. Horizontal deflection circuit 22 responds to the 15,750 Hz. horizontal sync signal derived from the composite video field signal to control the horizontal deflection of the scanning beam 14 in the manner hereinbefore described.

The field-per-frame exposure control circuit 74 receives the field rate signal FP on conductor 75, frame rate signal on conductor 76 and receives, through switches 26*b* and 26*c*, first and second switching signals E and $\bar{E}$ produced by the vertical deflection circuit 20. The circuit 74, described in greater detail in the aforementioned U.S. application, Ser. No. 268,320 includes a counter that counts the number of vertical synchronizing pulses occurring in the period of the frame rate signal to produce an inhibit signal when the counted number exceeds a predetermined number. The inhibit signal, when applied to the gate terminals of FET switches 72 and 78, renders the switches nonconductive for a period of one or more video fields until the production of a first or second switching signal in response to the first pulse of the vertical synchronizing signal that follows, in time, a frame rate signal so that each media frame on the film 36 is exposed to an equal number of video fields.

The luminance signal Y is normally transmitted by FET switch 72 to a junction point 80 of resistor 82 and switch 26*f* where a positive voltage $+V_k$ is added to the luminance signal Y at junction point 80 to provide a constant bias signal for the cathode 16. The bias signal and the luminance signal Y are thereafter applied by switch 26*f* to the cathode 16 of the flying spot scanner 12 to modulate the instantaneous intensity of the scanning beam 14 at the face plate of the flying spot scanner tube 12 as a function of the instantaneous intensity of the luminance signal Y derived from the composite video field signal. Thus the beam 14 is modulated in intensity by the derived luminance signal Y and, when a black and white video field signal is to be recorded on black and white film 36, the luminance signal Y is sufficient to accomplish the exposure of the film 36, the optical filter 60 being moved out of the scanning beam 14.

Figure 2:
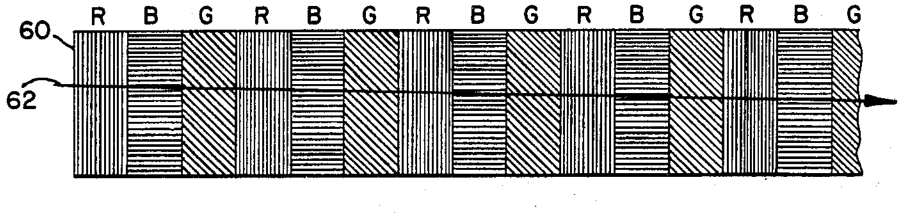
FIG. 2 is a diagram of an enlarged portion of the optical filter employed in the video recording apparatus of FIG. 1.
Figure 3:
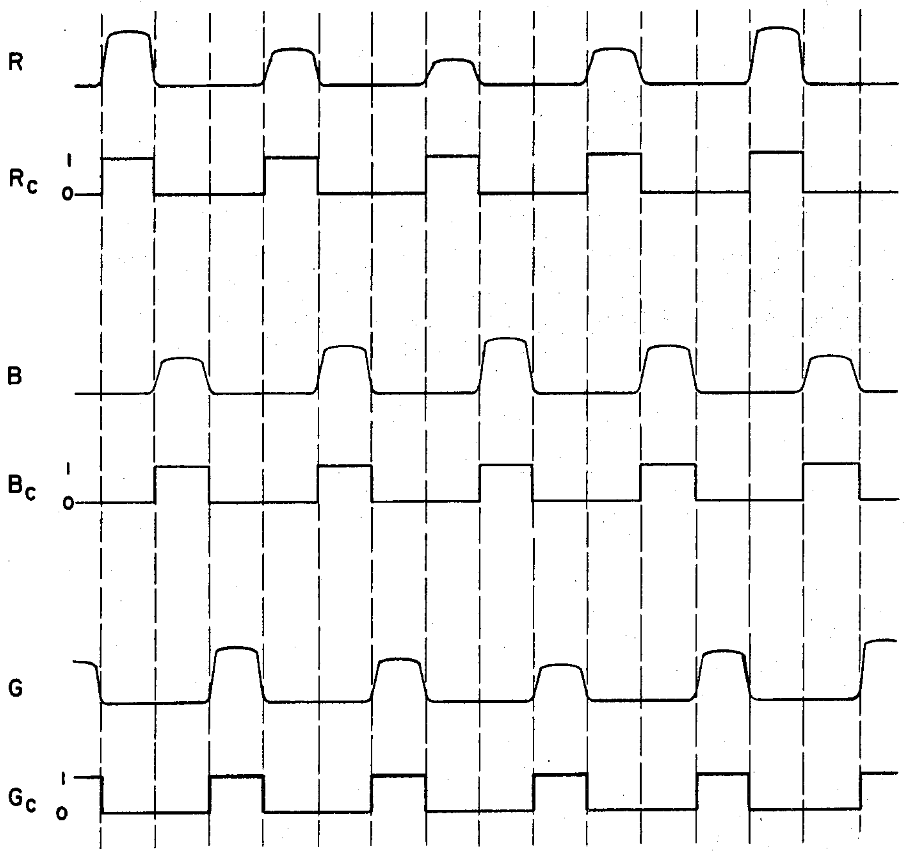
FIG. 3 is a wave form diagram depicting various signals developed at several points in the circuit diagram of FIG. 1.

To accomplish color and intensity modulation of the beam 14, an optical filter 60 is interposed into the path of the beam 14 between the face plate of the flying spot scanner 12 and the scanning zone 38. A section of the optical filter 60 is shown in FIG. 2, and it comprises a repetitive pattern of red, blue and green filter stripes designated R, B and G that are equal in width. The repetitive pattern is shown greatly enlarged in FIG. 2, and it will be understood that the width of each color filter stripe is substantially on a par with the resolution achievable on the face plate of the flying spot scanner tube 12. Therefore, as the scanning beam of light traverses the optical filter 60 along the path 62 during each horizontal line scan, the optical filter 60 acts to repetitively pass red, blue and green etc., through the repetitive color filter stripes of the optical filter 60. Thus color is imparted to the beam of white light generated by the flying spot scanner tube 12. In FIG. 3, the wave form diagrams labeled R, B and G correspond to the variable amplitude color signals derived by the photosensitive devices 52a–52c at each point in the traversal of the filter stripes of FIG. 2 by a scanning beam 14 varied in intensity in a scanner to be described hereinafter.

The control of the color intensity modulation of the scanning beam 14 will now be explained with reference to the remaining elements of the circuit that comprise a feed back loop including means responsive to the instantaneous color of light in the scanning beam 14 transmitted through the red, blue and green color filter stripes to apply the corresponding red, blue or green signals $R_v - Y$, $B_v - Y$ and $G_v - Y$, to the grid 32 of the flying spot scanner 12 to modulate the intensity of the color of light in the scanning beam 14 transmitted through the corresponding color filter stripe. The total intensity modulation of the beam 14 is a function of the summation of the color difference signal, e.g. $R_v - Y$ applied to grid 32, with the luminance signal Y applied to cathode 16, that is, $R_v - Y + Y = R_v$, for example.

To avoid duplication of parts, the photosensitive media 36 comprises color sensitive film without an opaque backing so that the filtered beam of light 14 may expose the corresponding color sensitive layers of the photosensitive film 36 and thereafter be detected by the same optical-to-electrical signal transducer elements as are used during video reproduction. Accordingly, the red, blue and green light transmitted by the red, blue and green color filter stripes of the optical filter 60 are detected and produced the color signals R, B and G at the output terminals of amplifiers 54a–54c respectively.

During video recording, the switches 56a–56c are positioned as shown in FIG. 1 to transmit the red color signal R to the positive input terminal of differential amplifier 84 and the negative input terminal of differential amplifier 86, the blue color signal B to the positive input terminal of differential amplifier 86 and the negative input terminal of differential amplifier 88, and the green color signal G to the positive input terminal of differential amplifier 88 and the negative input terminal of differential amplifier 84. Each amplifier has a pair of complementary outputs, e.g. 84a and 84b that are connected in the manner shown in the inputs of digital AND gates 90a–90c. The differential amplifiers 84, 86 and 88 compare the amplitudes of the color signals with each other to develop complementary color difference signals at each complementary output in such a way that only one of the AND gates will be enabled to produce the control signals (shown in FIG. 3 as $R_c$, $B_c$ and $G_c$) when a corresponding one of the color signals is larger in amplitude than the remaining two color signals.

As an example, when the red signal R is greater than the blue signal B and the green signal G as shown by comparison of the relative amplitudes of the signals R, B and G in FIG. 3, the difference level at output conductor 84a will be positive in polarity since the signal relationship $R > G$ is satisfied. The complementary difference level on the output conductor 84b is negative in polarity. At the same time, the difference level on the output conductor 86b is positive since the signal relationship $R > B$ is satisfied, and the difference level on the complementary output conductor 86a is negative. The difference levels of the output conductors 88a and 88b are both zero since neither of the color signal conditions $G > B$ or $B > G$ are satisfied. Consequently, since the difference levels on output conductors 86b and 84a only are positive and high, only AND gate 90b is operative to produce the red control signal $R_c$ shown in FIG. 3. The red control signal $R_c$ is conducted to the gate input of FET switch 70a which is rendered conductive thereby.

When FET switch 70a is rendered conductive, the red color difference signal $R_v - Y$ only is transmitted along conductor 92, through normally conductive FET switch 78 to the junction point 94 of resistor 96 and switch 26e, where voltage $V_{Gl}$ is summed with signal $R_v - Y$ and applied to the grid 32 of the flying spot scanner 12. If the televised video signal at that instant has a large red content, the signal $R_v - Y$ will be positive and relatively high in amplitude. The brightness of the scanning spot will be increased accordingly as the high amplitude signal $R_v - Y$ is applied to the control grid 32 and the film is exposed at that instant through the corresponding red filter bar of optical filter 60 to a relatively high intensity beam of red light. Similarly, if the red content of the color difference signal is low, the signal $R_v - Y$ will be relatively low in amplitude or negative and will lower the instantaneous intensity of the beam of red light exposing the film 36. It will be understood that the voltages $V_K$ and $V_{Gl}$ are selected so that when no luminance and color difference signals are applied respectively to the cathode and grid of tube 12, no scanning beam will be produced and tube 12 will be maintained black.

In the same manner, as the scanning beam 14 traverses each of the color filter stripes of the optical filter 60, the video signal of the corresponding color is applied to the control grid 32 of the flying spot scanner 12 to modulate the instantaneous intensity of the scanning beam 14.

Although the optical filter 60 is shown in FIG. 2 to comprise a series of color filter stripes extending in the vertical scanning direction of the flying spot scanner 12, it will be understood that the repetitive pattern of the optical filter 60 may be oriented in parallel with the horizontal deflection of the scanning beam 14. This latter alternative may be preferred since successive scanning raster positions on the media frames of the photosensitive media 40 are displaced vertically due to the interlaced scanning pattern developed in response to the horizontal and vertical synchronizing signal, and therefore, every spot on the film frame may be successively exposed through a variety of color strips, the number depending upon the number of television field raster patterns positioned on each media frame under the control of the circuit 74.

It may alternately be preferred to use an optical filter made on a colorless glass substrate with clear portions between the successive color filter stripes. Employing this type of optical filter, the luminance signal Y applied to the cathode 16 of the flying spot scanner 12 alone would influence scanning beam intensity, and the film color layers would be exposed to the white light passing through the clear portions. With this filter, the color balance of the successive exposures of the same film area may be difficult to attain as the intensity of the beam 14 under the sole influence of luminance signal Y may differ markedly from the intensity of the beam 14 under the combined influence of the luminance and color video signals.

The principles of this invention may also be applied to the use of a photosensitive media 36 comprising a motion picture film incorporating on or within the film optical color filters of the type described and only a single black and white emulsion layer. Such a film would readily lend itself to rapid processing, perhaps in the video teleplayer itself. The invention as described would operate in the same manner to control the exposure of the special film to the color video signal corresponding to the instantaneous color of light in the scanning beam 14 passing through the color filter in the film. In this regard, if a negative black and white emulsion film is more feasible for rapid processing within the teleplayer, a negative exposure and hence a positive final transparency, may be provided by controlling the brightness of the scanning beam 14 with electrically inverted color video and luminance signals.

Although the particularly described chrominance signals comprise color difference signals, it will be understood that I and Q or R, G and B video chrominance signals may also be used to practice my invention through suitable modification of the disclosed preferred embodiment thereof.

The invention has been described in detail with particular reference to a preferred embodiment thereof, but it will be understood that variations and modifications can be effected within the spirit and scope of the invention.

I claim:

1. Video recording apparatus for recording video information derived from composite video field signals including horizontal and vertical synchronizing signals and a plurality of chrominance signals as color pictorial information in media frames on photosensitive media advanced through a media scanning zone, said video recording apparatus comprising:

a. scanning means responsive to the chrominance signals for generating a beam of light comprising a plurality of colors of light corresponding to the plurality of chrominance signals and responsive to the horizontal and vertical synchronizing signals for deflecting said beam of light in a video field scanning pattern and for directing said beam of light in a predetermined path to expose said photosensitive media in said media scanning zone to said beam of light;

b. optical filter means disposed in said predetermined path comprising a repetitive pattern of a plurality of color filters selectively transmissive of the corresponding plurality of colors in said beam of light deflected in said scanning pattern across said repetitive pattern of color filter stripes and upon said photosensitive media in said media scanning zone;

c. optical-to-electrical signal transducer means responsive to the plurality of colors in said beam of light transmitted through said plurality of color filters for producing a corresponding plurality of color control signals; and d. means responsive to the plurality of color control signals for applying the respective plurality of color signals to said scanning means to modulate the intensity of the color of light concurrently transmitted by the corresponding color filters of said optical filter means.

2. The apparatus of claim 1 wherein the plurality of chrominance signals comprise red, green and blue chrominance signals, said photosensitive media comprises photosensitive color motion picture film, said scanning means comprises a source of white light, said optical filter means comprises a repetitive pattern of red, green and blue color filter stripes, said optical-to-electrical signal transducer means is responsive to the red, green and blue colors of light to produce red, green and blue color control signals, and said color control signal responsive means is responsive to the red, green and blue color control signals for applying the red, green and blue chrominance signals, respectively, to said scanning means to modulate the intensity of the color of light concurrently transmitted by said optical filter means.

3. The apparatus of claim 2 wherein said red, green and blue filter stripes of said optical filter means extend in a direction transverse to the direction of horizontal deflection of said beam of light generated by said scanning means under the control of the horizontal synchronizing signals and in parallel with the direction of advancement of the photosensitive film through said media scanning zone.

4. The apparatus of claim 1 wherein said plurality of color filters of said optical filter means comprise parallel color filter stripes which extend in a direction transverse to the direction of horizontal deflection of said beam of light generated by said scanning means under the control of the horizontal synchronizing signal and parallel to the direction of advancement of the photosensitive media through said media scanning zone.

5. The apparatus of claim 1 wherein said photosensitive media is transmissive of the plurality of colors of light transmitted by the respective plurality of color filters of said optical filter means, and said optical-to-electrical signal transducer means in responsive to the plurality of colors of light in said beam of light transmitted through said first and second color filter means and through said photosensitive media exposed to said colors of light to produce the corresponding plurality of color control signals.

6. A method of recording video information derived from composite video signals including horizontal and vertical synchronizing signals and a plurality of chrominance signals as color pictorial information in media frames on photosensitive media advanced through a media scanning zone, said video recording method comprising the steps of:

a. generating a beam of light comprising at least a plurality of colors of light corresponding to the plurality of chrominance signals;

b. deflecting the beam of light in a video field scanning pattern of successive vertically displaced horizontal line scans in response to the horizontal and vertical synchronizing signals and directing said beam of light deflected in said video field scanning pattern in a predetermined path;

c. selectively transmitting each of the corresponding plurality of colors of light in said beam of light deflected in said predetermined path to repetitively expose said photosensitive media in said media scanning zone to each color of light during each horizontal line scan;

d. detecting the plurality of colors of light in said beam of light successively transmitted to said photosensitive media and producing a corresponding plurality of color control signals; and e. alternately applying one of the plurality of chrominance signals to said scanning means to modulate the intensity of the color of light currently transmitted by said optical filter in response to the corresponding color control signal.

7. The method of claim 6 wherein said selectively transmitting step comprises positioning optical filters comprising a repetitive pattern of a plurality of color filter stripes in said predetermined path, said color filter stripes extending in a direction transverse to the direction of horizontal deflection of the beam of light and parallel to the direction of advancement of said photosensitive media through said media scanning zone.

8. Video recording apparatus for recording video information derived from composite video field signals including horizontal and vertical synchronizing signals and a plurality of chrominance signals as color pictorial information in media frames on photosensitive media continuously advanced through a media scanning zone at a predetermined rate of movement, the composite video field signals recurring at a field rate dependent upon the vertical synchronizing signal that differs from the frame rate of said photosensitive media, said video recording apparatus comprising:

a. means for generating a beam of light comprising at least a plurality of colors of light corresponding to the plurality of chrominance signals for directing said beam of light along a predetermined path to expose said photosensitive media advanced through said media scanning zone to said beam of light;

b. synchronizing means responsive to the frame rate of advancement of said photosensitive media and the vertical synchronizing signal for producing a scan modification signal representative of the position of successive media frames continuously advanced through said media scanning zone;

c. scanning means responsive to the horizontal and vertical synchronizing signals for deflecting said beam of light in a video field scanning pattern comprising a plurality of vertically displaced horizontal line scans recurring at said television field rate frequency and responsive to the scan modification signal for superimposing said video field scanning patterns on said media frames advanced through said media scanning zone;

d. optical filter means comprising a repetitive pattern of a plurality of color filter stripes corresponding to the plurality of colors in said beam of light, said optical filter means disposed in said predetermined path to selectively transmit the corresponding plurality of colors in said beam of light deflected over said optical filter means in said video field scanning pattern to said photosensitive media advanced through said media scanning zone;

e. optical-to-electrical signal transducer means responsive to the light transmitted through said optical filter means for detecting the instantaneous color of the light selectively transmitted by the plurality of color filter stripes and for producing a corresponding plurality of color control signals in response thereto; and f. means responsive to the color control signals and the corresponding chrominance signals for modulating the instantaneous intensity of said beam of light by said scanning means as a function of the intensity of the chrominance signal corresponding to the color control signal.

* * * * *